US011766635B2

(12) United States Patent
Matsubara

(10) Patent No.: US 11,766,635 B2
(45) Date of Patent: Sep. 26, 2023

(54) GAS RECOVERING APPARATUS, SEMICONDUCTOR MANUFACTURING SYSTEM, AND GAS RECOVERING METHOD

(71) Applicant: Kioxia Corporation, Tokyo (JP)

(72) Inventor: Yuya Matsubara, Yokkaichi (JP)

(73) Assignee: Kioxia Corporation, Tokyo (JP)

( * ) Notice: Subject to any disclaimer, the term of this patent is extended or adjusted under 35 U.S.C. 154(b) by 147 days.

(21) Appl. No.: 17/350,912

(22) Filed: Jun. 17, 2021

(65) Prior Publication Data
US 2022/0072473 A1 Mar. 10, 2022

(30) Foreign Application Priority Data
Sep. 8, 2020 (JP) .................................. 2020-150742

(51) Int. Cl.
*B01D 53/22* (2006.01)
*C01B 23/00* (2006.01)

(52) U.S. Cl.
CPC ........ *B01D 53/229* (2013.01); *C01B 23/0094* (2013.01); *B01D 2053/223* (2013.01); *B01D 2258/0216* (2013.01); *C01B 2210/0031* (2013.01); *C01B 2210/0065* (2013.01); *C01B 2210/0098* (2013.01); *C01P 2006/82* (2013.01)

(58) Field of Classification Search
None
See application file for complete search history.

(56) References Cited

U.S. PATENT DOCUMENTS

| 4,056,373 | A | * | 11/1977 | Rubin | B01D 53/22 29/402.13 |
| 5,888,273 | A | * | 3/1999 | Buxbaum | B01D 53/22 95/55 |
| 2002/0104435 | A1 | * | 8/2002 | Baker | B01D 53/228 95/55 |
| 2010/0317751 | A1 | * | 12/2010 | Van Brugge | B01D 53/228 95/55 |
| 2013/0008311 | A1 | * | 1/2013 | Ohuchi | B01D 53/22 96/4 |
| 2013/0047845 | A1 | * | 2/2013 | Sampath | B01D 19/0031 96/6 |
| 2019/0193022 | A1 | | 6/2019 | Yamanaka et al. | |
| 2021/0238034 | A1 | * | 8/2021 | Kambara | B01D 53/229 |

(Continued)

FOREIGN PATENT DOCUMENTS

| JP | 7-253272 A | 10/1995 |
| JP | 2003-68629 A | 3/2003 |
| JP | 2011-189229 A | 9/2011 |

(Continued)

*Primary Examiner* — Jason M Greene
(74) *Attorney, Agent, or Firm* — Oblon, McClelland, Maier & Neustadt, L.L.P.

(57) ABSTRACT

According to one embodiment, a gas recovering apparatus includes a casing and a tube. The casing is provided with an inlet through which a gas flows in, a first outlet for discharging a first gas containing a gas to be recovered of the gas, and a second outlet for discharging a second gas other than the first gas of the gas. The casing is evacuated via the first outlet. The tube is provided in the casing from the inlet to the second outlet, and has a high permeability to the first gas and a low permeability to the second gas.

20 Claims, 3 Drawing Sheets

(56) References Cited

U.S. PATENT DOCUMENTS

2021/0245133 A1\* 8/2021 Soane ................. B01D 53/229

FOREIGN PATENT DOCUMENTS

| JP | 2011-230035 | A | 11/2011 |
| JP | 2019-118860 | A | 7/2019 |
| TW | M385661 | U1 | 8/2010 |
| TW | 201815460 | A | 5/2018 |

\* cited by examiner

GAS RECOVERING APPARATUS, SEMICONDUCTOR MANUFACTURING SYSTEM, AND GAS RECOVERING METHOD

CROSS REFERENCE TO RELATED APPLICATIONS

This application is based upon and claims the benefit of priority from the prior Japanese Patent Application No. 2020-150742, filed on Sep. 8, 2020, the entire contents of which are incorporated herein by reference.

FIELD

Embodiments of the present invention relate to a gas recovering apparatus, a semiconductor manufacturing system, and a gas recovering method.

BACKGROUND

An exhaust gas generated in a semiconductor process contains a rare helium gas. However, it is difficult to recover helium from the exhaust gas in which a total flow rate increases due to addition of a diluent gas for explosion protection and a combustion gas for detoxification.

DETAILED DESCRIPTION

Figure 1:
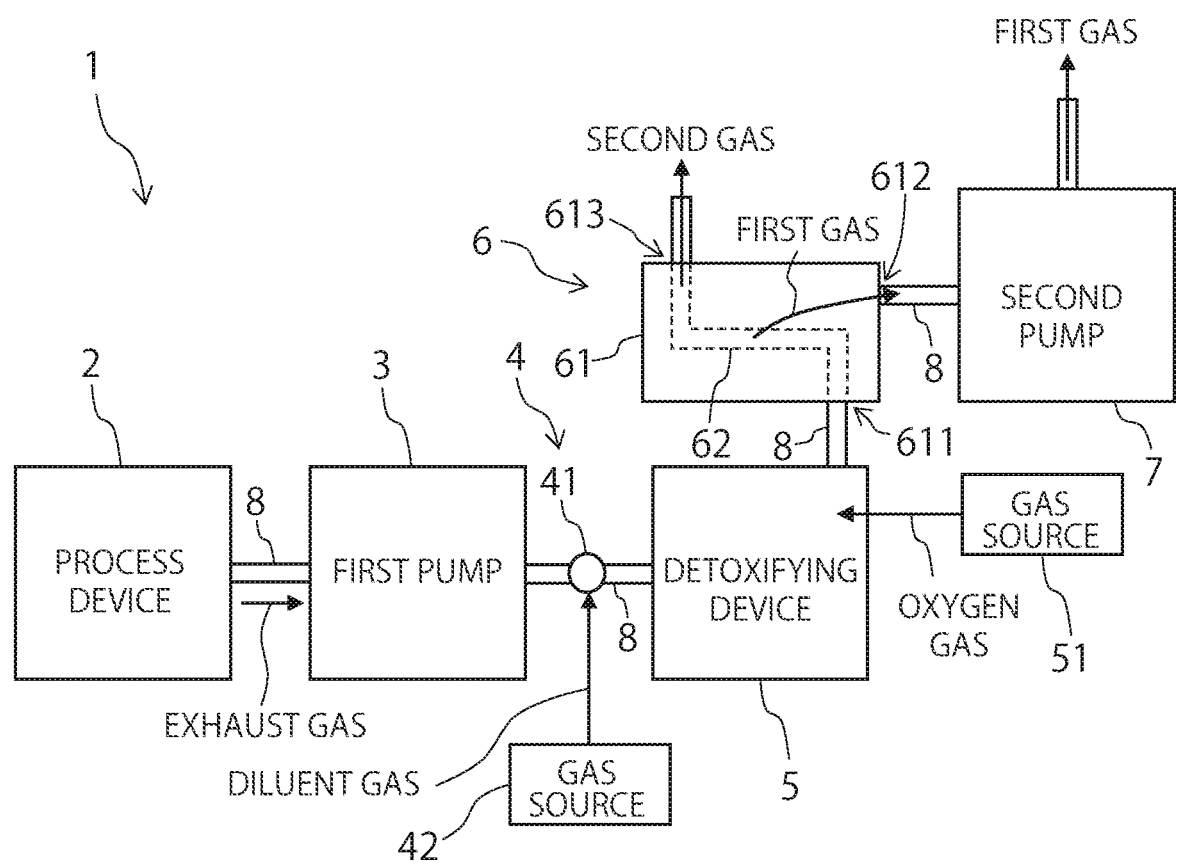
FIG. 1 is a diagram illustrating a semiconductor manufacturing system according to a first embodiment.

A gas recovering apparatus according to the present embodiment includes a casing and a tube. The casing is provided with an inlet through which a gas flows in, a first outlet for discharging a first gas of the gas, the first gas containing a gas to be recovered, and a second outlet for discharging a second gas other than the first gas of the gas. The casing is evacuated via the first outlet. The tube is provided in the casing from the inlet to the second outlet, and has a high permeability to the first gas and a low permeability to the second gas.

Embodiments of the present invention will now be explained with reference to the accompanying drawings. In FIGS. 1 to 4, identical or similar constituent elements are denoted by like reference characters and redundant explanations thereof are omitted.

First Embodiment

FIG. 1 is a diagram illustrating a semiconductor manufacturing system 1 according to a first embodiment. As illustrated in FIG. 1, the semiconductor manufacturing system 1 according to the first embodiment includes a process device 2, a first pump 3, a diluent-gas supply device 4, a detoxifying device 5, a gas recovery unit 6, and a second pump 7.

The process device 2 manufactures a semiconductor device by using a process gas containing a gas to be recovered, and discharges an exhaust gas generated in manufacturing of the semiconductor device. The exhaust gas contains a gas which was not used in reaction of the process gas and a byproduct gas generated as a result of reaction of the process gas. The gas to be recovered is, for example, a rare gas. The rare gas may be a helium gas. The exhaust gas also contains, for example, a silane gas, an ammonia gas, an argon gas, and the like other than the gas to be recovered.

The first pump 3 is connected to the process device 2 via a pipe 8 on a downstream side of the gas. The first pump 3 suctions the exhaust gas from the process device 2 by evacuating the process device 2, and discharges the suctioned exhaust gas to a downstream side.

The diluent-gas supply device 4 is connected to the first pump 3 via the pipe 8 on the downstream side of the gas. The diluent-gas supply device 4 includes a valve 41 provided on the pipe 8 downstream of the first pump 3 and a gas source 42 connected to the valve 41. In order to ensure explosion protection of the exhaust gas containing a combustible gas, the diluent-gas supply device 4 supplies a diluent gas to the pipe 8 downstream of the first pump 3 from the gas source 42 in a state where the valve 41 is opened, thereby diluting the exhaust gas downstream of the first pump 3. The diluent gas is, for example, a nitrogen gas. A flow rate of the diluent gas supplied from the diluent-gas supply device 4 may be more than a flow rate of the exhaust gas discharged from the process device 2.

The detoxifying device 5 is connected to the diluent-gas supply device 4 via the pipe 8 on the downstream side of the gas. The detoxifying device 5 adds an oxygen gas to the diluted exhaust gas from a gas source 51 and burns the exhaust gas by using the oxygen gas. By burning the exhaust gas, a harmful gas is removed from the exhaust gas to detoxify the exhaust gas. For example, the detoxifying device 5 detoxifies the exhaust gas by removing a silane gas and an ammonia gas from the exhaust gas. In the detoxifying device 5, a flow rate of the oxygen gas added to the exhaust gas may be more than the flow rate of the exhaust gas discharged from the process device 2.

The gas recovery unit 6 is connected to the detoxifying device 5 via the pipe 8 on the downstream side of the gas. A total flow rate of the exhaust gas discharged from the process device 2 increases since other gases are added in a period until the exhaust gas is discharged from the detoxifying device 5. The gas recovery unit 6 is provided to recover the gas to be recovered efficiently from the exhaust gas having the large total flow rate.

The gas recovery unit 6 includes a hollow casing 61 and a hollow gas separation tube 62. In the casing 61, an inlet 611, an outlet 612, and an outlet 613 are provided. The exhaust gas discharged from the detoxifying device 5 flows into the inlet 611. A first gas containing the gas to be recovered of the exhaust gas flowing into the inlet 611 is discharged from the outlet 612. A second gas other than the first gas of the exhaust gas flowing into the inlet 611 is discharged from the outlet 613. The first gas is a mixed gas of, for example, a helium gas as the gas to be recovered, water vapor, and an oxygen gas. The second gas is a mixed gas of, for example, a nitrogen gas, a carbon dioxide gas, and an argon gas. The casing 61 is evacuated via the outlet 612.

The gas separation tube 62 is provided from the inlet 611 to the outlet 613 in the casing 61. That is, the gas separation tube 62 is connected to the inlet 611 with one end on an upstream side of the gas, and is connected to the outlet 613 with the other end on the downstream side of the gas. The gas separation tube 62 (more specifically, a side wall of the gas separation tube 62) has a high permeability to the first gas and a low permeability to the second gas. By having a high permeability to the first gas and a low permeability to the second gas, the gas separation tube 62 separates the first gas and the second gas from each other. The first gas has a smaller molecular size than the second gas. Therefore, the gas separation tube 62 may have a high permeability to the first gas. Alternatively, since the first gas has a weaker interaction with the gas separation tube 62 than the second gas, the gas separation tube 62 may have a high permeability to the first gas. In other words, since the first gas has a smaller molecular size than the second gas and has a weaker interaction with the gas separation tube 62 than the second gas, the gas separation tube 62 may have a high permeability to the first gas.

In order to cause the first gas to permeate the gas separation tube 62 efficiently, the gas separation tube 62 is made of a porous material. The porous material may be an organic material. The organic material may be fluorine resin. For example, the gas separation tube 62 may be inexpensively made of polytetrafluoroethylene (PTFE) which is an example of fluorine resin. The gas separation tube 62 made of PTFE has a small molecular weight and a high diffusion coefficient, or easily causes a gas having a high solubility in a tube material to permeate the gas separation tube 62 selectively.

Specifically, of the mixed gas of a plurality of gases, a gas having a small molecular weight and a large diffusion coefficient or a gas having a high solubility easily permeates the gas separation tube 62 made of PTFE. For example, a permeability coefficient (unit: $cm^3 * cm * cm^{-2} * s^{-1} * cmHg^{-1}$) of a helium gas through PTFE is $1.9 \times 10^{-9}$. A permeability coefficient of an oxygen gas through PTFE is $4.2 \times 10^{-10}$. A permeability coefficient of water vapor through PTFE is $3.6 \times 10^{-8}$. A permeability coefficient of a carbon dioxide gas through PTFE is $1.2 \times 10^{-9}$. On the other hand, of the mixed gas, a gas having a large molecular weight and a small diffusion coefficient or a gas having a low solubility is difficult to permeate the gas separation tube 62 made of PTFE. Specifically, a permeability coefficient of a nitrogen gas through PTFE is $1.4 \times 10^{-10}$.

The second pump 7 is connected to the gas recovery unit 6 via the pipe 8 on the downstream side of the gas. The second pump 7 evacuates the casing 61 via the outlet 612, thereby generating a pressure difference between the inside and outside of the gas separation tube 62 in such a manner that the outside of the gas separation tube 62 has a lower pressure than the inside of the gas separation tube 62 in the casing 61. In view of efficient recovery of the gas to be recovered, it is desired that the second pump 7 evacuates the casing 61 to a vacuum state. Of the exhaust gas in the gas separation tube 62, the first gas having a high permeability through the gas separation tube 62 permeates from the inside to outside of the gas separation tube 62 and is discharged from the outlet 612, due to the pressure difference between the inside and outside of the gas separation tube 62. On the other hand, the second gas having a low permeability through the gas separation tube 62 stays in the gas separation tube 62 and continues to move toward the outlet 613.

The gas to be recovered contained in the first gas may permeate from the inside to outside of the gas separation tube 62 according to the following expression.

$$V = (A \times \Delta P \times L \times S)/d \quad (1)$$

where V is a permeation volume (sccm) (i.e. permeation amount) of the gas to be recovered with respect to the gas separation tube 62 in the expression (1). A is a permeability coefficient of the gas to be recovered with respect to the gas separation tube 62. $\Delta P$ is a pressure difference between the inside and outside of the gas separation tube 62. L is a length of the gas separation tube 62. S is a cross-sectional area of a gas flow path in the gas separation tube 62, and d is a difference between an inner radius and an outer radius of the gas separation tube 62, that is, a thickness of a side wall in a radial direction of the gas separation tube 62.

The dimensions L, S, and d of the gas separation tube 62 for recovering the gas to be recovered in a desired volume V can be designed according to the expression (1).

A purification line of the gas to be recovered (not illustrated) is connected to the second pump 7 on the downstream side of the gas. The second pump 7 discharges the first gas toward the purification line of the gas to be recovered. For example, when the first gas is a mixed gas of a helium gas as the gas to be recovered, water vapor, and an oxygen gas, the helium gas can be recovered by separating the water vapor and the oxygen gas from the helium gas in the purification line.

In the semiconductor manufacturing system 1 having the configuration described above, the exhaust gas discharged from the process device 2 by a suction power of the first pump 3 is diluted by the diluent gas supplied from the diluent-gas supply device 4 in a flow path on the downstream side of the first pump 3 to ensure explosion protection. Since the exhaust gas is diluted by the diluent gas, the total flow rate of the exhaust gas increases.

Next, the diluted exhaust gas flows into the detoxifying device 5 and is detoxified by being burnt using an oxygen gas in the detoxifying device 5. Addition of the oxygen gas further increases the total flow rate of the exhaust gas.

Next, the detoxified exhaust gas flows into the gas separation tube 62 of the gas recovery unit 6 through the inlet 611. A pressure difference is generated between the inside and outside of the gas separation tube 62 in such a manner that the outside of the gas separation tube 62 has a lower pressure than the inside thereof by evacuation of the casing 61 by the second pump 7. The exhaust gas flowing into the gas separation tube 62 moves in the gas separation tube 62 toward the outlet 613.

In a process of moving in the gas separation tube 62, of the exhaust gas in the gas separation tube 62, the first gas having a high permeability through the gas separation tube 62 permeates from the inside to outside of the gas separation tube 62 due to the pressure difference between the inside and outside of the gas separation tube 62. The first gas having permeated the gas separation tube 62 is suctioned by the second pump 7 and discharged from the outlet 612 to the outside of the gas recovery unit 6.

On the other hand, of the exhaust gas in the gas separation tube 62, the second gas having a low permeability through the gas separation tube 62 does not permeate the gas separation tube 62 even by the pressure difference between the inside and outside of the gas separation tube 62. The second gas which does not permeate the gas separation tube 62 is discharged to the outside of the gas recovery unit 6 through the outlet 613.

The first gas discharged from the outlet 612 is discharged toward the purification line of the gas to be recovered by the second pump 7, and the gas to be recovered is separated from other components in the purification line and recovered.

According to the first embodiment, the first gas having a high permeability through the gas separation tube 62 of the exhaust gas in the gas separation tube 62 can be selectively caused to permeate the gas separation tube 62 to the outside and discharged from the outlet 612, by using the pressure difference between the inside and outside of the gas separation tube 62 generated by evacuation of the casing 61 as a driving force. As a result, the gas to be recovered contained in the first gas can be efficiently recovered from the exhaust gas having a large total flow rate.

Second Embodiment

Figure 2:
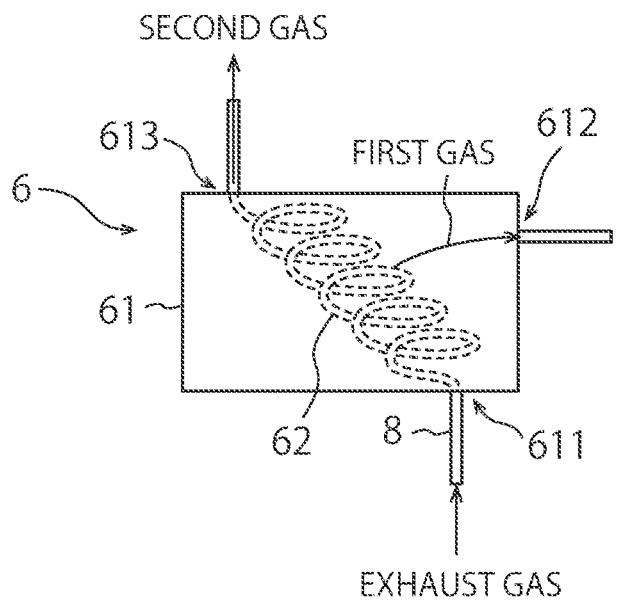
FIG. 2 is a diagram illustrating a gas recovering apparatus in a semiconductor manufacturing system according to a second embodiment.

Next, a second embodiment in which the gas separation tube 62 is provided in a spiral manner is described. FIG. 2 is a diagram illustrating the gas recovery unit 6 in the semiconductor manufacturing system 1 according to the second embodiment.

As illustrated in FIG. 2, in the gas recovery unit 6 according to the second embodiment, the gas separation tube 62 is provided in a spiral manner from the inlet 611 to the outlet 613.

Since the gas separation tube 62 is provided in a spiral manner, a surface area of the gas separation tube 62 can be increased in a limited space in the casing 61 with a reasonable configuration. By increasing the surface area of the gas separation tube 62, a dwell time of the exhaust gas in the gas separation tube 62 can be extended. By extending the dwell time of the exhaust gas in the gas separation tube 62, the volume of the first gas which is discharged from the outlet 613 without permeating the gas separation tube 62 can be suppressed. As a result, the gas to be recovered can be recovered from the exhaust gas having a large total flow rate more efficiently.

Third Embodiment

Figure 3:
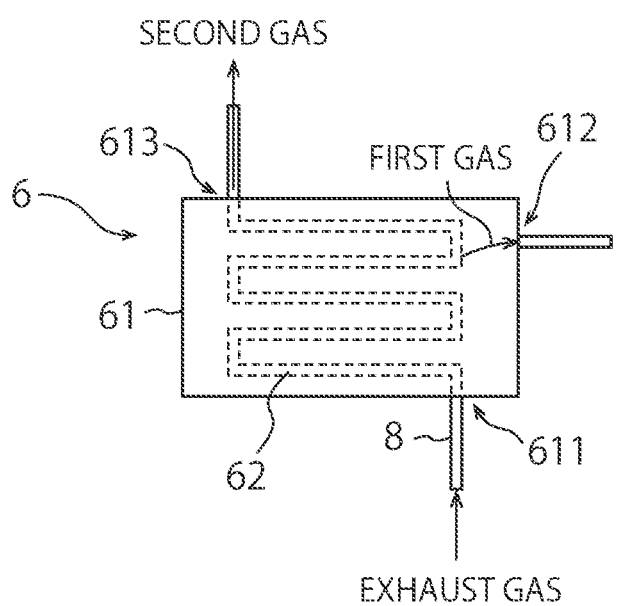
FIG. 3 is a diagram illustrating a gas recovering apparatus in a semiconductor manufacturing system according to a third embodiment.

Next, a third embodiment in which the gas separation tube 62 is provided to have a folded portion is described. FIG. 3 is a diagram illustrating the gas recovery unit 6 in the semiconductor manufacturing system 1 according to the third embodiment.

As illustrated in FIG. 3, in the gas recovery unit 6 according to the third embodiment, the gas separation tube 62 is provided to have a folded portion from the inlet 611 to the outlet 613.

Since the gas separation tube 62 is provided to have the folded portion, as in the second embodiment, a surface area of the gas separation tube 62 can be increased in a limited space in the casing 61 with a reasonable configuration. As a result, the gas to be recovered can be recovered from the exhaust gas having a large total flow rate more efficiently.

Fourth Embodiment

Figure 4:
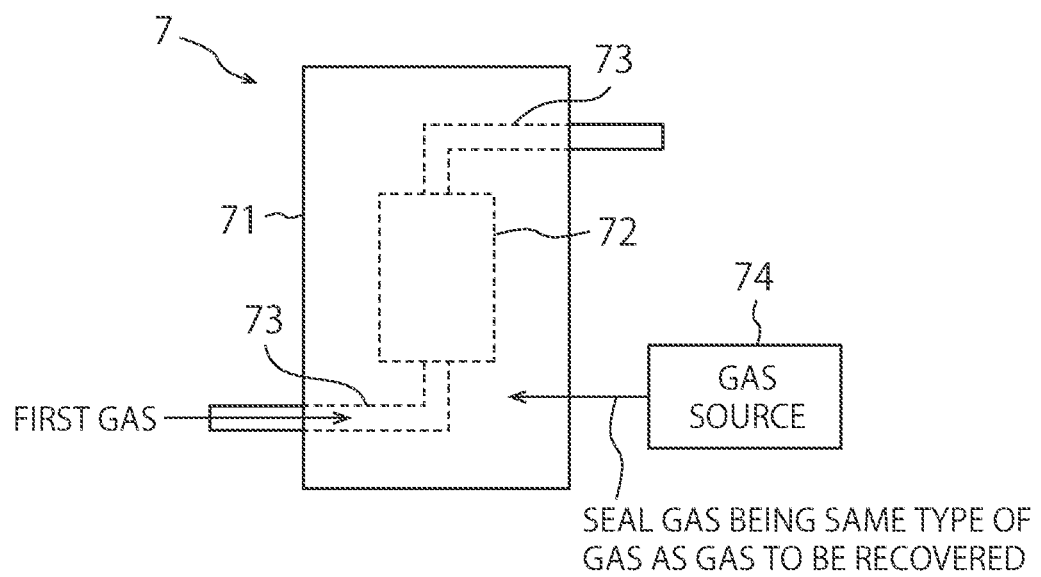
FIG. 4 is a diagram illustrating a pump in a semiconductor manufacturing system according to a fourth embodiment.

Next, a fourth embodiment in which the same type of gas as the gas to be recovered is used as a seal gas for the second pump 7 is described. FIG. 4 is a diagram illustrating the second pump 7 in the semiconductor manufacturing system 1 according to the fourth embodiment.

The second pump 7 is a dry pump not using an oil or a liquid but using a gas for sealing the gas flow path. Specifically, as illustrated in FIG. 4, the second pump 7 includes a casing 71, a pump body 72 arranged in the casing 71, and a pipe 73 connected to the pump body 72 on an upstream side and a downstream side of the gas. The pump body 72 includes, for example, a casing, a rotor accommodated in the casing to suction and discharge the first gas by a rotary motion, and a motor that generates power to rotate the rotor. In order to suppress that a connection portion between the pipe 73 and the pump body 72 becomes loose due to vibrations of the motor to cause leakage of the first gas from the pipe 73, a seal gas is supplied into the casing 71 from a gas source 74. The seal gas is supplied to the connection portion between the pipe 73 and the pump body 72, thereby suppressing leakage of the first gas from the connection portion to the outside.

As the seal gas, a nitrogen gas is frequently used. On the other hand, in the present embodiment, the same type of gas as the gas to be recovered, for example, a helium gas is used as the seal gas. By using the same type of gas as the gas to be recovered as the seal gas, impurities can be prevented from mixing in the gas to be recovered. As a result, the gas to be recovered having high purity can be recovered.

The second to fourth embodiments described above may be combined with one another as appropriate.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor manufacturing system, comprising:
   a semiconductor manufacturing apparatus configured to manufacture a semiconductor device by using a process gas comprising a gas to be recovered and discharge an exhaust gas generated due to manufacturing of the semiconductor device;
   a dilution device configured to dilute the exhaust gas by a diluent gas;
   a detoxifying device configured to detoxify the exhaust gas by burning the diluted exhaust gas by using an oxygen gas; and
   a gas recovering apparatus configured to recover the gas to be recovered from the detoxified exhaust gas, wherein
   the gas recovering apparatus comprises a casing provided with an inlet through which the detoxified exhaust gas flows in, a first outlet for discharging a first gas comprising a gas to be recovered of the detoxified exhaust gas, and a second outlet for discharging a second gas other than the first gas of the detoxified exhaust gas, and evacuated via the first outlet; and
   a tube provided in the casing from the inlet to the second outlet, and having a high permeability to the first gas and a low permeability to the second gas.

2. The system of claim 1, wherein the first gas comprises a helium gas as the gas to be recovered, a hydrogen gas, water vapor, and an oxygen gas, and the second gas comprises a nitrogen gas as the diluent gas, a carbon dioxide gas, and an argon gas.

3. The system of claim 2, wherein the detoxifying device is configured to detoxify the diluted exhaust gas by removing a silane gas and an ammonia gas from the diluted exhaust gas.

4. A gas recovering method, wherein
   a gas to be recovered is recovered by using a gas recovering apparatus comprising:
   a casing provided with an inlet through which a gas generated due to manufacturing of a semiconductor device flows in after the gas is diluted and detoxified, a first outlet for discharging a first gas comprising the gas to be recovered of the gas, and a second outlet for discharging a second gas other than the first gas of the gas, and evacuated via the first outlet; and a tube provided in the casing from the inlet to the second outlet, and having a high permeability to the first gas and a low permeability to the second gas, and recovery of the gas to be recovered comprises:

generating a pressure difference between inside and outside of the tube in such a manner that outside of the tube has a lower pressure than inside of the tube in the casing; and causing the first gas to permeate from inside to outside of the tube due to the pressure difference and to be discharged from the first outlet.

5. The method of claim 4, further comprising separating the gas to be recovered from the first gas discharged from the first outlet.

6. The system of claim 1, wherein the tube is provided in a spiral manner from the inlet to the second outlet.

7. The system of claim 1, wherein the tube is provided to have a folded portion from the inlet to the second outlet.

8. The system of claim 1, further comprising a pump connected to the first outlet.

9. The system of claim 8, wherein the pump evacuates the casing via the first outlet, thereby generating a pressure difference between inside and outside of the tube in such a manner that outside of the tube has a lower pressure than inside of the tube in the casing, and the first gas permeates from inside to outside of the tube due to the pressure difference and is discharged from the first outlet.

10. The system of claim 9, wherein the pump evacuates the casing to a vacuum state.

11. The system of claim 9, wherein the gas to be recovered permeates from inside to outside of the tube according to a following expression;

$V=(A \times \Delta P \times L \times S)/d$, where

V: a permeation volume of the gas to be recovered with respect to the tube,

A: a permeability coefficient of the gas to be recovered with respect to the tube, $\Delta P$: a pressure difference between inside and outside of the tube, L: a length of the tube, S: a cross-sectional area of a gas flow path in the tube, and d: a difference between an inner radius and an outer radius of the tube.

12. The system of claim 8, wherein the pump uses a same type of gas as the gas to be recovered as a seal gas.

13. The system of claim 8, wherein the pump discharges the first gas toward a purification line of the gas to be recovered.

14. The system of claim 1, wherein the tube comprises a porous material.

15. The system of claim 14, wherein the tube comprises an organic material.

16. The system of claim 15, wherein the tube comprises fluorine resin.

17. The system of claim 16, wherein the first gas comprises a gas having a molecular weight smaller than that of the second gas and a diffusion coefficient higher than that of the second gas or a gas having a solubility in the tube, of the gas higher than that the second gas.

18. A gas recovering method, comprising:

diluting an exhaust gas, the exhaust gas is generated due to manufacturing of a semiconductor device by using a process gas comprising a gas to be recovered;

detoxifying the exhaust gas by burning the diluted exhaust gas by using an oxygen gas; and recovering the gas to be recovered from the detoxified exhaust gas by a gas recovering apparatus, wherein the gas recovering apparatus comprises a casing and a tube, the casing is provided with an inlet through which the detoxified exhaust gas flows in, a first outlet for discharging a first gas comprising a gas to be recovered of the detoxified exhaust gas, and a second outlet for discharging a second gas other than the first gas of the detoxified exhaust gas, and evacuated via the first outlet, and the tube is provided in the casing from the inlet to the second outlet, and has a high permeability to the first gas and a low permeability to the second gas, wherein recovery of the gas to be recovered comprises:

generating a pressure difference between inside and outside of the tube in such a manner that outside of the tube has a lower pressure than inside of the tube in the casing; and causing the first gas to permeate from inside to outside of the tube due to the pressure difference and to be discharged from the first outlet.

19. The method of claim 18, further comprising separating the gas to be recovered from the first gas discharged from the first outlet.

20. The method of claim 18, wherein diluting the exhaust gas by a dilution device using a diluent gas, and detoxifying the exhaust gas by burning the diluted exhaust gas by using an oxygen gas by a detoxifying device.

* * * * *